US007077246B2

(12) United States Patent
Timtner

(10) Patent No.: US 7,077,246 B2
(45) Date of Patent: Jul. 18, 2006

(54) FALL SAFETY DEVICE

(75) Inventor: Karlheinz Timtner, Bad Homburg vor der Höhe (DE)

(73) Assignee: Ringspann GmbH, Bad Homburg (DE)

( * ) Notice: Subject to any disclaimer, the term of this patent is extended or adjusted under 35 U.S.C. 154(b) by 27 days.

(21) Appl. No.: 10/855,474

(22) Filed: May 27, 2004

(65) Prior Publication Data

US 2004/0262109 A1 Dec. 30, 2004

(30) Foreign Application Priority Data

May 30, 2003 (DE) ................................ 103 24 900

(51) Int. Cl.
*F16D 63/00* (2006.01)

(52) U.S. Cl. ..................... 188/189; 188/82.9; 188/175; 188/181 A; 188/196 BA; 188/134

(58) Field of Classification Search ............... 188/82.9, 188/140 R, 142, 174, 175 X, 178, 180, 181 A, 188/184 X, 187, 189 X, 196 B, 196 BA, 188/196 D, 119, 126, 129, 134 X, 135, 136, 188/139, 82.9 X
See application file for complete search history.

(56) References Cited

U.S. PATENT DOCUMENTS

| | | | | |
|---|---|---|---|---|
| 3,946,898 | A * | 3/1976 | Prillinger et al. | 220/325 |
| 4,005,771 | A * | 2/1977 | Cappotto et al. | 400/338.2 |
| 4,254,854 | A * | 3/1981 | St. John | 192/105 CD |
| 4,282,953 | A * | 8/1981 | Lichti et al. | 188/189 |
| 4,556,155 | A * | 12/1985 | Koppensteiner | 254/391 |
| 5,310,022 | A * | 5/1994 | Sheridan et al. | 187/305 |
| 5,522,581 | A * | 6/1996 | Kulhavy | 254/267 |
| 5,701,972 | A * | 12/1997 | Bloder | 182/234 |
| 2001/0037920 | A1* | 11/2001 | Draper et al. | 188/180 |
| 2004/0035653 | A1* | 2/2004 | Christensen | 188/135 |
| 2004/0262109 | A1* | 12/2004 | Timtner | 188/377 |

FOREIGN PATENT DOCUMENTS

DE 24 33 237 5/1977

* cited by examiner

*Primary Examiner*—Devon Kramer
(74) *Attorney, Agent, or Firm*—Volpe and Koenig, P.C.

(57) ABSTRACT

A fall safety device is provided having a load-bearing rotor 2, which supports at least one locking member 6, which can be moved by centrifugal force and which is moved into engagement with at least one stop 7*b* of a stator 4 if a certain rotor speed is exceeded and blocks the further rotation of the rotor 2. The locking member 6 and/or the stop 7*b* is in active connection with a braking body 8, which undergoes a plastic deformation when engaging the fall safety device and damps the stopping process.

20 Claims, 10 Drawing Sheets

A - A

Schnitt B-B
Section Cut B-B

Drehzahl größer Stopdrehzahl
Speed greater than stopping speed

Schnitt F-F
Section Cut F-F

Schnitt D-D
Section Cut D-D

FALL SAFETY DEVICE

BACKGROUND

The invention relates to a fall safety device with a load-bearing rotor that supports at least one locking member, which can be moved by centrifugal force and which is engages with at least one stop of a stator if a certain rotor speed is exceeded to block further rotation of the rotor.

Such fall safety devices are used in a wide variety of lifting machines, such as elevators, cranes, and the like, so that the load cannot fall in the event of disruptions in the drive system. Such disruptions can be caused by breaks in the drive rope, loss of power, leaks in a compressed-medium line, loss of a braking system, etc. Frequently, the mentioned fall safety devices are mandated by law in order to prevent accidents.

According to the known state of the art, contemporary fall safety devices are predominantly brakes, latches, or bolt safety devices. However, brakes carry the risk that they could overheat due to heat from friction. At the same time, the braking process is also associated with material wear and tear. Both can lead to the loss of the brakes, especially if they are not regularly and carefully maintained.

These disadvantages are avoided in latch or bolt safety devices. However, the form fit necessary for the blocking process causes large forces and impacts due to the abrupt blocking process. Therefore, such safety devices are not suitable for large loads.

Through DE 24 33 237, a fall safety device has become known. Here, the stops are formed by a locking wheel, which can rotate in the stator to a limited extent. This locking wheel is held in its normal position by a damping clamp bent into a C-shape and arranged on the outside of the stator housing. If an impermissibly high rotor speed is reached, then the locking members that can move by centrifugal force are moved into engagement with the stops of the locking wheel and attempt to turn with this wheel. Here, the C-shaped damping clamp expands and is plastically deformed, which produces the desired damping of the blocking process.

SUMMARY

Starting with these conditions, the present invention is based on the object of improving a fall safety device working with a form-fitting blocking process to the extent that a significantly more effective damping is achieved during the blocking process. Here, the fall safety device should be distinguished by less space requirements, high operating reliability and robustness for all cases of use, as well as reliable function even after a long operating time.

This object is solved according to the invention in that the braking body is no longer arranged as before in the open, but instead is located in a chamber. Therefore, its deformation during the blocking process can be selectively influenced through the shape and size of the chamber, and overall a higher energy absorption through the braking body is achieved. This applies, in particular, when the braking body must slide along the chamber walls during its plastic deformation, because then in addition to the deformation energy, frictional energy is also available for the damping process.

In another improvement of the damping effect, according to the invention the deformation of the braking body is not realized as in the known case by an expansion, but instead by reduction in the sense of plastic compression. At the same time, this results in a more favorable damping characteristic than for tensile loading of the braking body.

In another advantageous refinement of the invention, if the predetermined rotor speed is exceeded, either the previously mentioned or an additional locking member that can move due to centrifugal force blocks the further rotation of the rotor, also for overloading or failure of the braking body. The fall safety device is therefore redundant.

In terms of the type of deformation of the braking body, numerous possibilities are known to someone skilled in the art. The deformation can be realized both in the circumferential direction as well as in the axial or radial direction. A combination of these deformation directions into a diagonal or helical course also lies within the scope of the invention.

For the form-fitting engagement between the rotor and stator, it is recommended that the stator has at least two stops distributed over the circumference. A separate braking body is allocated to each of these stops. It is even more favorable to arrange several stops on a ratchet wheel that can rotate in the stator and to support this ratchet wheel on the stator in the circumferential direction by means of several braking bodies.

If the deformation of the braking body is realized in the axial direction, then it is preferred that the rotor has two opposite threads, on which disks can rotate, such that the disks shift in the axial direction during the blocking process and thus deform the braking body. The braking body is here arranged advantageously between the two disks, so that it is compressed. Likewise, however, the braking body could also be arranged between a disk and the adjacent wall of the stator housing.

For the structural configuration of the deformable braking body, numerous possibilities are available for someone skilled in the art. It is especially favorable when the braking body has a plurality of recesses. In this way, it can be flattened without requiring additional space for absorbing the movement. Advantageously, it can be formed of several flattenable bands, which are especially arranged one next to the other and which are especially made of ductile metal. Also, the use of several flattenable individual bodies, which can be arranged one behind the other, like balls or similarly shaped bodies, is conceivable.

So that the fall safety device can be checked at any time from outside for whether the device is still intact, it is recommended to arrange the braking body in a chamber that can be viewed from outside. Therefore, at any time visual inspection is possible without having to remove the previous cover parts or the like.

As an alternative or an addition, the braking body can also have a pointer element projecting outwards, whose position can be used to determine whether the braking body has assumed a flattened or an unflattened position. In connection with this, it is especially advantageous if this pointer element is brought into active connection with the lifting drive, e.g., by means of an end switch, so that bringing the lifting system back on-line is only possible when the deformed braking body has been replaced by a new braking body.

Depending on whether the braking body is to interact with the locking member arranged in the rotor or with the stop arranged in the stator, the braking body can be arranged either in one or else in the other component. If the stator is a component surrounding the rotor on the outside, then the arrangement of the braking body in the stator provides the advantage that more space is available.

In another advantageous refinement of the invention, the locking member supported on the rotor is not only exposed to the influence of the centrifugal force, but instead it is held by a snap-in connection in the rotational position, thus, out of engagement with the one or more stops of the stator. This gives the advantage that strong shaking cannot inadvertently lock the device. Simultaneously, through this snap-in connection, a defined centrifugal force and thus a defined speed of the rotor can be predetermined, and if these values are exceeded, the locking member can slide out of the snap-in connection and trigger the blocking process. The snap-in connection preferably is formed of a pretensioned locking element, whose pretensioning force can be adjusted.

An especially favorable refinement of the invention is to provide at least two locking members and to set these locking members in active connection such that they can be led into engagement with the associated stops only in common. In this way, the reliability of the fall safety device for external shaking is improved considerably, because unintended locking of an individual locking member due to a local impact is excluded. The cross acceleration exerted here on the opposing locking members acts in opposite senses on these members, so that the effect of the impact can be compensated for by the coupling of the locking members. Instead, the locking effect can only then occur if the triggering force is generated by centrifugal acceleration, which acts in the radial direction and which acts on both locking members in the same sense.

For the structural configuration of the mentioned active connection, various possibilities are available for someone skilled in the art. In principle, it merely has to be provided that the movement of one locking member is transferred to the other locking member, and that is in the same functional sense. For locking members that can pivot, a connecting lever is recommended, which is hinged relative to the locking member pivot axis at opposing regions of the locking members. For linearly moveable locking members, a crossbar control mechanism can be used.

In an especially favorable refinement of the invention, structural means guarantee that after plastic deformation of the braking body, the locking member can be brought back into the open position from its engagement position only if the deformed braking body has been replaced by a new braking body. Here, the deformation of the braking body can be used to create the desired fixation of the locking member. However, usually it is more reliable to use the relative rotation between the ratchet wheel and stator to fix the locking member in the engagement position. To mechanically convert the relative rotation into the fixing of this locking member, numerous possibilities are available for someone skilled in the art. Advantageously, the relative rotation can create an axial shift in the ratchet wheel, wherein the ratchet wheel is shaped such that in its shifted position, it directly or indirectly blocks a release of the locking member from this engagement position.

BRIEF DESCRIPTION OF THE DRAWINGS

Additional features and advantages of the invention result from the description of the exemplary embodiments with reference to the drawing as well as from the drawings themselves. In the drawings.

DETAILED DESCRIPTION OF THE PREFERRED EMBODIMENTS

Figure 1:
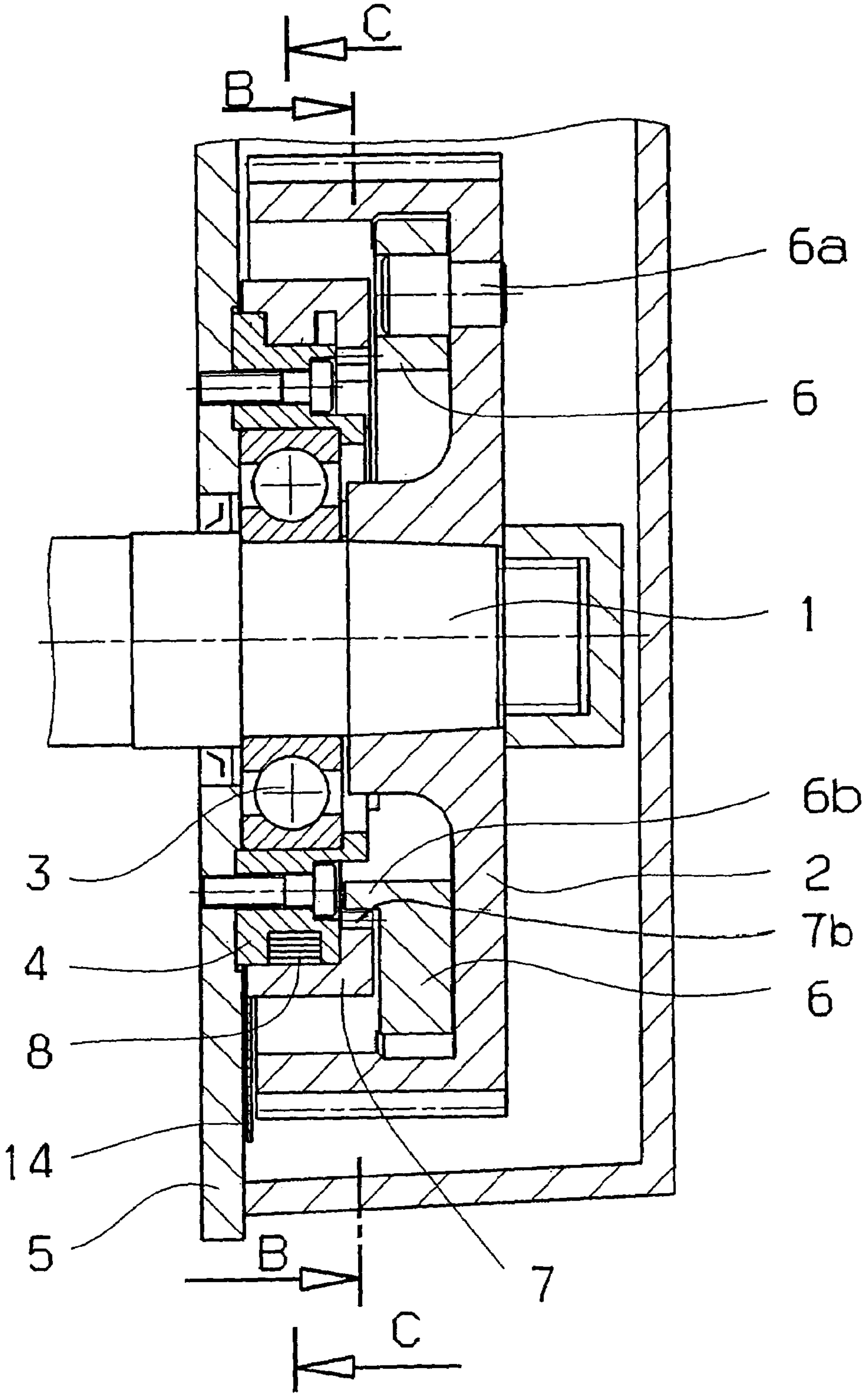
FIG. 1 is an axial cross-sectional view through the fall safety device.

In FIG. 1, a rotor can be seen in the form of a central shaft 1, on which a gear 2 is mounted in a non-rotatable manner. The shaft 1 is supported in an annular stator 4 of a stationary housing 5 by means of a ball bearing 3.

On a radial inner edge of the gear 2, two opposing locking members 6 are supported so that they can pivot in the radial direction by means of support pins 6*a*. These locking members can be shifted outwards with their center of gravity if a certain shaft speed is exceeded, wherein a locking wedge 6*b* of the locking member 6 engages with stops 7*b*, which are arranged on a ratchet ring 7. On its side, the ratchet ring 7 can rotate on the already mentioned, annular stator 4, which is mounted with screws and bolts to a wall of the housing 5.

Figure 3:
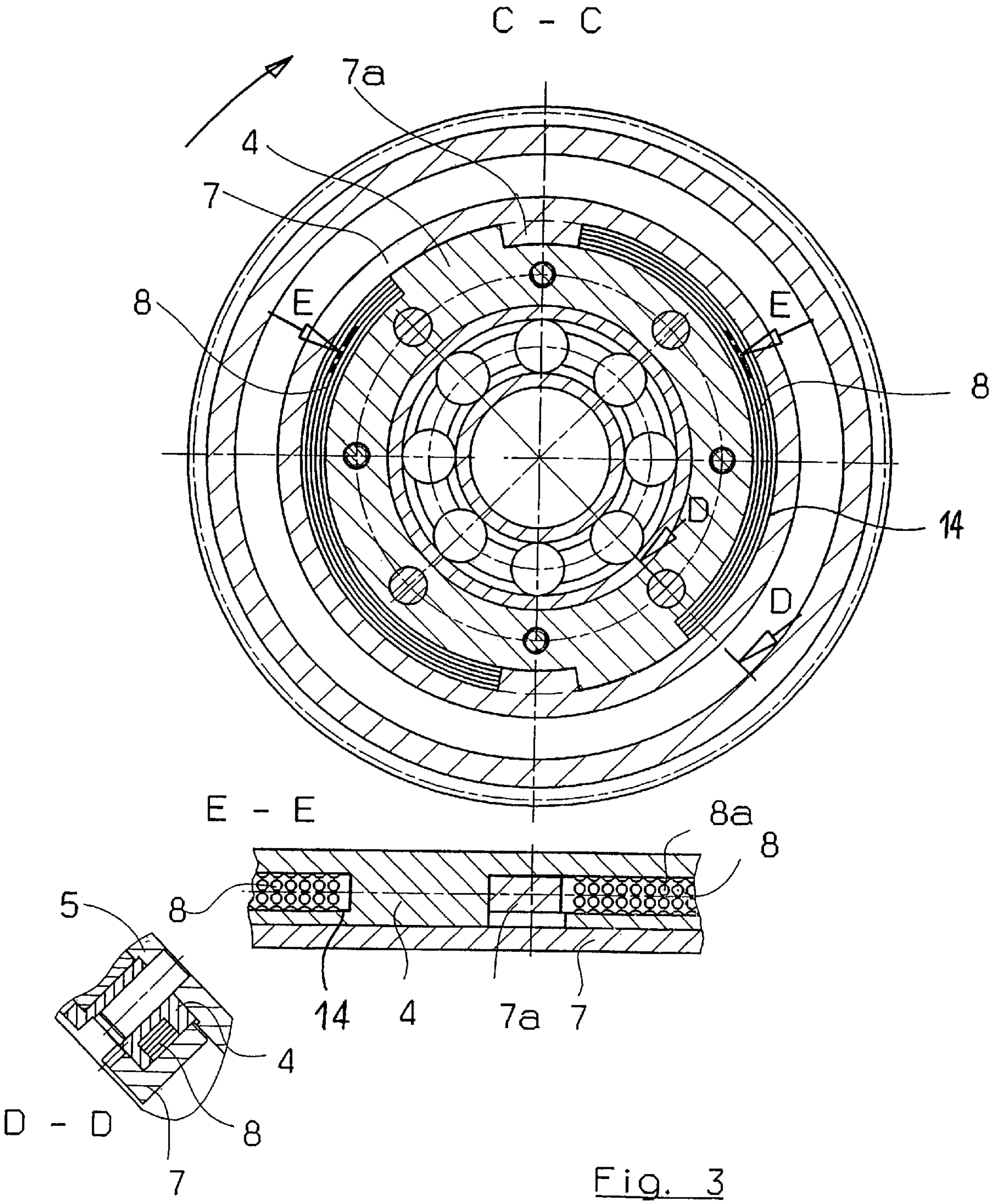
FIG. 3 is a radial cross-sectional view taken along the line C—C in FIG. 1.

Now it is essential that the ratchet ring 7 cannot rotate freely on the stator 4, but instead it is supported in the circumferential direction by plastically deformable braking bodies 8, cf. FIG. 3, on the stator 4.

As FIG. 3 shows in particular, the braking bodies 8 extend in the circumferential direction over approximately 150° of the circumference. They can be guided in the circumferential direction in a chamber 14 in the form of a groove of the stator 4, but their length is dimensioned so that they fill up the corresponding groove in the circumferential direction and only just permit the entry of a projection 7*a* of the ratchet ring 7 into the groove. Under normal conditions, the ratchet ring 7 is thus held stationary on the stator 4 and the locking members 6 fit under the ratchet ring with a certain safety distance.

Figure 2:
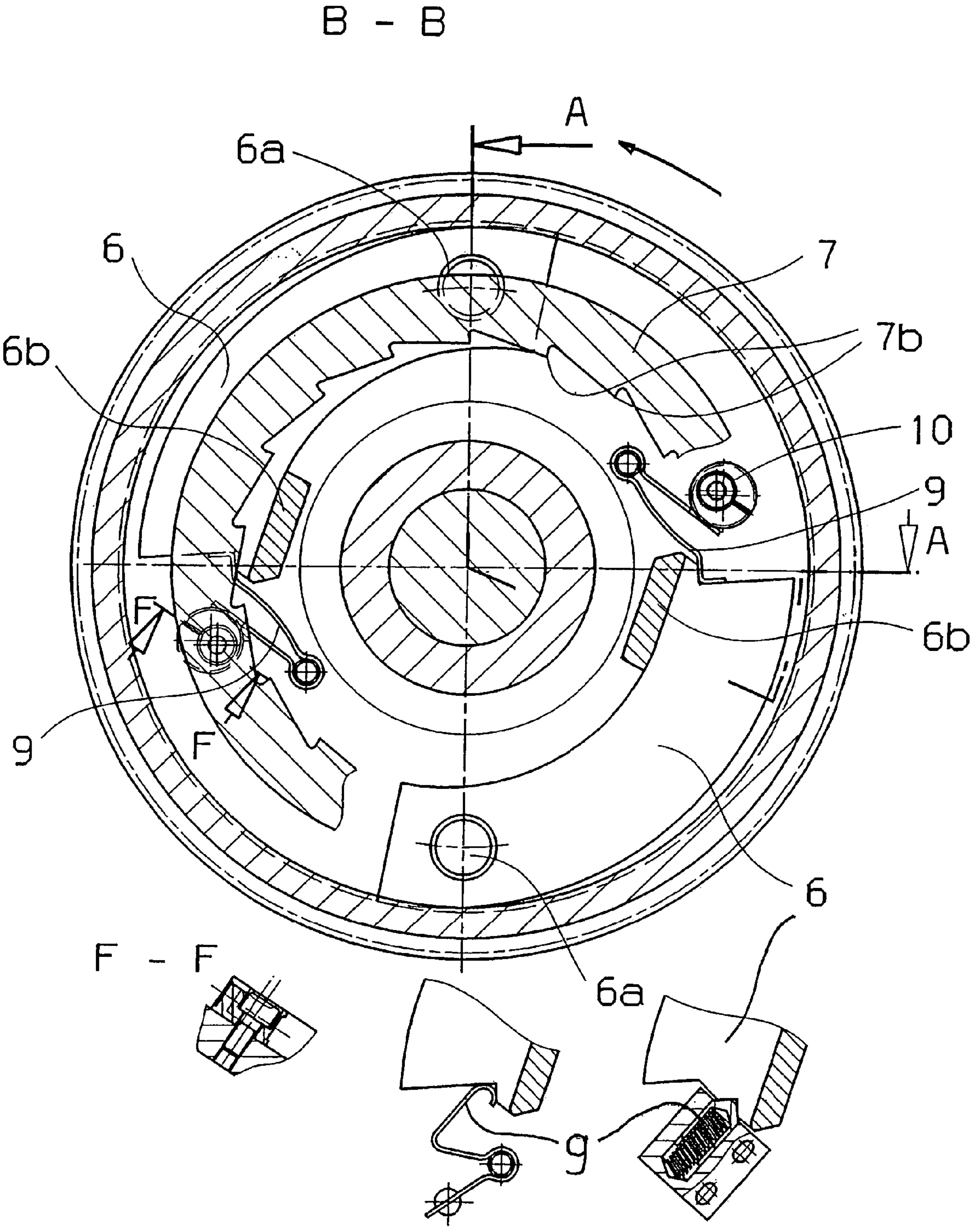
FIG. 2 is a radial cross-sectional view taken along the line B—B in FIG. 1.

Now if an impermissibly high speed of the shaft 1 occurs and thus the locking member 6 engages with the ratchet ring 7, then the latter is quickly loaded against the counterclockwise direction for the structural shape according to FIG. 2. The braking bodies 8 are designed so that they flex under this load in the circumferential direction and undergo plastic deformation when they slide in the chamber 14.

For this purpose, the braking body 8, as the cut E—E in FIG. 3 shows, is formed of perforated metal bands with numerous recesses 8*a*, advantageously in several positions one above the other in the radial direction. Therefore, the braking body is in the position to convert the energy of motion of the shaft 1 over a rotational angle of approximately 10° to approximately 40° depending on its ability to flatten into deformation energy and frictional energy and therefore to replace and to drastically dampen the blocking process by a similar stopping process.

After a stopping process, to recognize whether the braking bodies have reached a degree of deformation, which excludes re-use, a pointer element 14 is mounted on the ratchet wheel 7, whose rotation relative to the stationary housing 13 indicates the degree of deformation. In addition, this element 14 can turn off the drive for the entire lifting device and/or trigger the previously discussed fixing of the locking members in their engagement position.

FIG. 2 shows that the two locking members 6 are held on their free ends by hook-shaped spring elements 9 in the unlocked position. Therefore, shaking cannot lead to an undesired triggering of the fall safety device. Instead, the centrifugal force must be so large that the holding connection between the locking members 6 and the spring elements 9 is canceled.

To set the triggering speed, the pressure of the spring elements 9 on the locking members 2 can be adjusted. The spring elements 9 therefore are under the effect of a cam 10, which amplifies or reduces the contact force of the spring element 9 according to its rotational position.

For the configuration of the spring element 9, numerous possibilities are available for someone skilled in the art. Two variants are shown in the lower part of FIG. 2.

Figure 4:
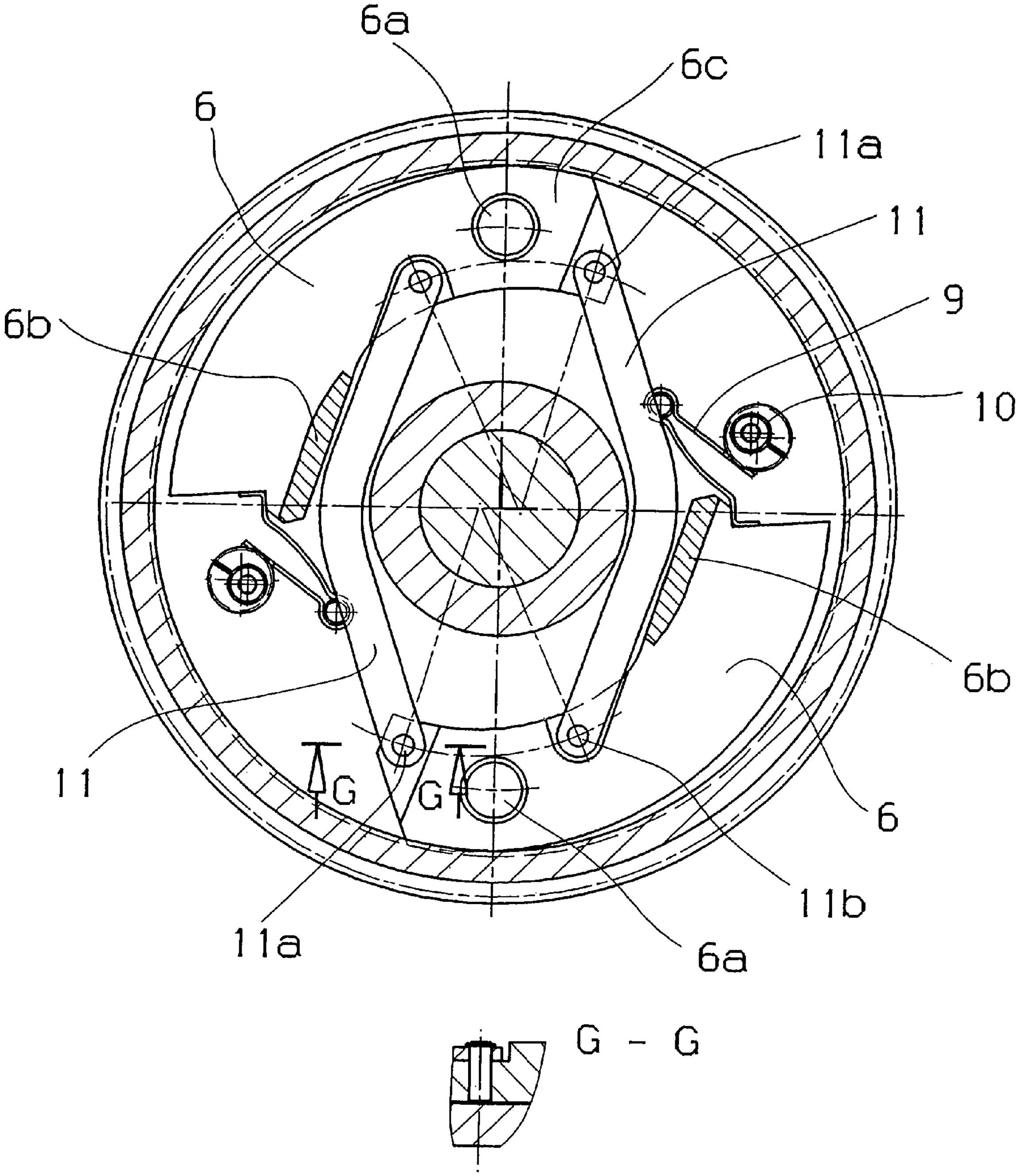
FIG. 4 is a radial cross-sectional view similar to FIG. 2, but for a different structural shape.

FIG. 4 shows a refinement of the invention, which in principle has the same structure and thus also carries the same reference symbols. Here, it is essential that the two locking members 6 are connected to each other by two levers 11 such that their pivoting movements are always performed simultaneously and in the same sense. For this purpose, each of the levers 11 is connected at its ends with opposing sides, relative to the pivot support 6*a*, of a locking member 6 so that they can pivot. If one considers, e.g., in FIG. 4, the lever at the right of the center, then this lever is connected at its upper end at 11*a* to a projection 6*c*, which lies on the other side like the wedge 6*b* relative to the pivot support 6*a*. In contrast, the lower end of the lever 11 at 11*b* is hinged to the part of the other locking member 6, which carries the wedge 6*b*. In this way, the contact points 11*a* and 11*b* each lie far removed from the adjacent pivot supports 6*a*.

Figure 5:
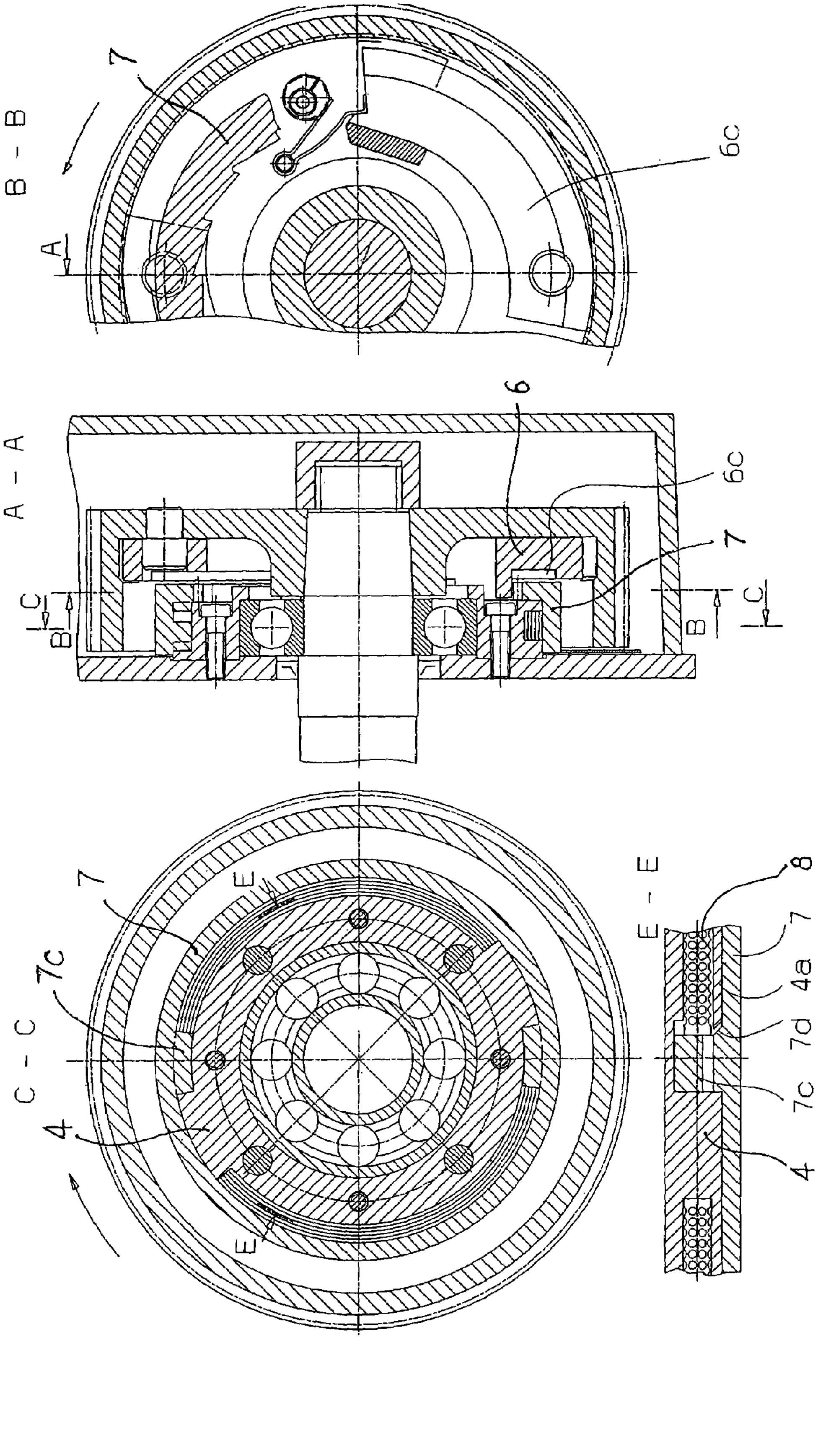
FIG. 5 is a number of cross-sectional views corresponding to FIGS. 1, 2, and 3, but for a different structural shape.

FIG. 5 shows a different advantageous refinement of the invention. As can be seen in Section E—E, the projections 7*c* of the ratchet wheel 7 are extended in the axial direction relative to the projections 7*a* of the previously described structural shape and are provided with a chamfer 7*d* at the foot. The collar 4*a* used for guiding the braking body 8 along the chamber 14 of the stator 4 is likewise chamfered. Through these diagonal surfaces, for relative rotation of the ratchet wheel 7 relative to the stator 4 and the resulting deformation of the braking body 8, the ratchet wheel 7 is shifted in the axial direction, downwards in the section E—E. Here, the ratchet wheel 7 in the sectional view A—A shifts to the right into a recess 6*c* of the locking member 6 and thus holds the locking member in a form fit in the engagement or blocking position. Therefore, unauthorized reinstatement is impossible, because the locking members can be returned into the open position, thus the operating position, only if the braking bodies have already been replaced.

The section B—B in FIG. 5 illustrates the profile of the recess 6*c* on the locking member 6. This recess runs in the circumferential direction over the entire length of the locking member, thus the ratchet wheel can always penetrate into the recess 6*c* independent of its angular position.

Alternatively, the axial shifting of the ratchet wheel can also be created as follows: the guidance collar 4*a* on the stator 4 is eliminated and the axial limitation of the chamber 14 for the braking bodies is formed by the ratchet wheel 7 itself. The braking bodies are shaped so that when their width is flattened, i.e., their extent in the axial direction increases and thus the ratchet wheel shifts in the direction of the locking members, especially into the recess 6*c* of the locking members.

Figure 6:
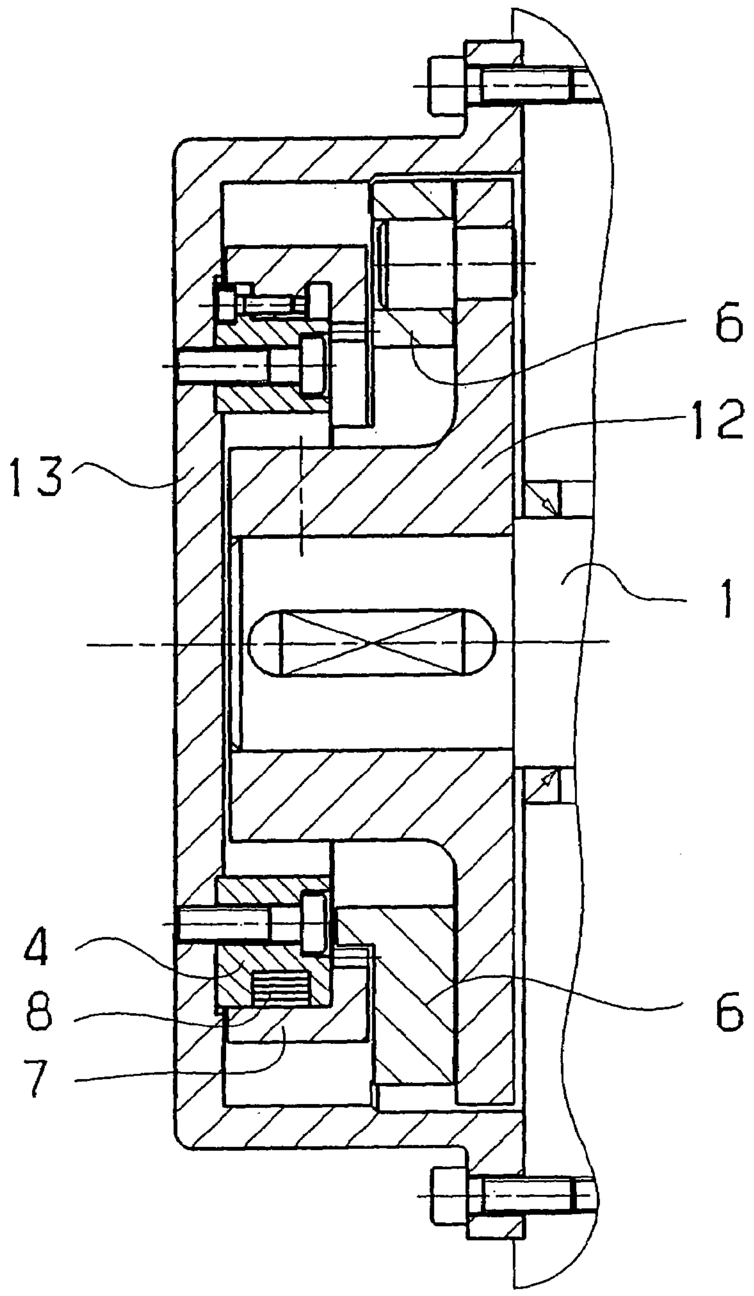
FIG. 6 is an axial cross-sectional view similar to FIG. 1, but as a built-on variant.

FIG. 6 shows a built-in variant for the fall safety device. Here, it is not installed like in FIG. 1 in a gear, but instead on the flange of a hub part.

Here, the shaft 1 is non-rotatably connected to a hub part 12, to which two locking members 6 are supported similar to FIG. 1 so that they can pivot, so that they are moved into form-fitting engagement with a ratchet ring 7 if a certain shaft speed is exceeded. This ratchet ring 7 is in turn supported on an annular stator 4 so that it can rotate, but supported in the circumferential direction over plastically deformable braking bodies 8 on the stator 4. The stator 4 is mounted on its side over a bell-shaped housing 13 stationary on the machine frame.

The method of operation is the same as for the previously described embodiments.

The embodiment according to FIGS. 7–11 are different from the previously described example essentially in that the braking bodies are no longer arranged and flattened in the circumferential direction, but instead in the axial direction. For reasons of simplicity, parts with corresponding functions have the same reference symbols as those used for the preceding embodiment.

Figure 7:
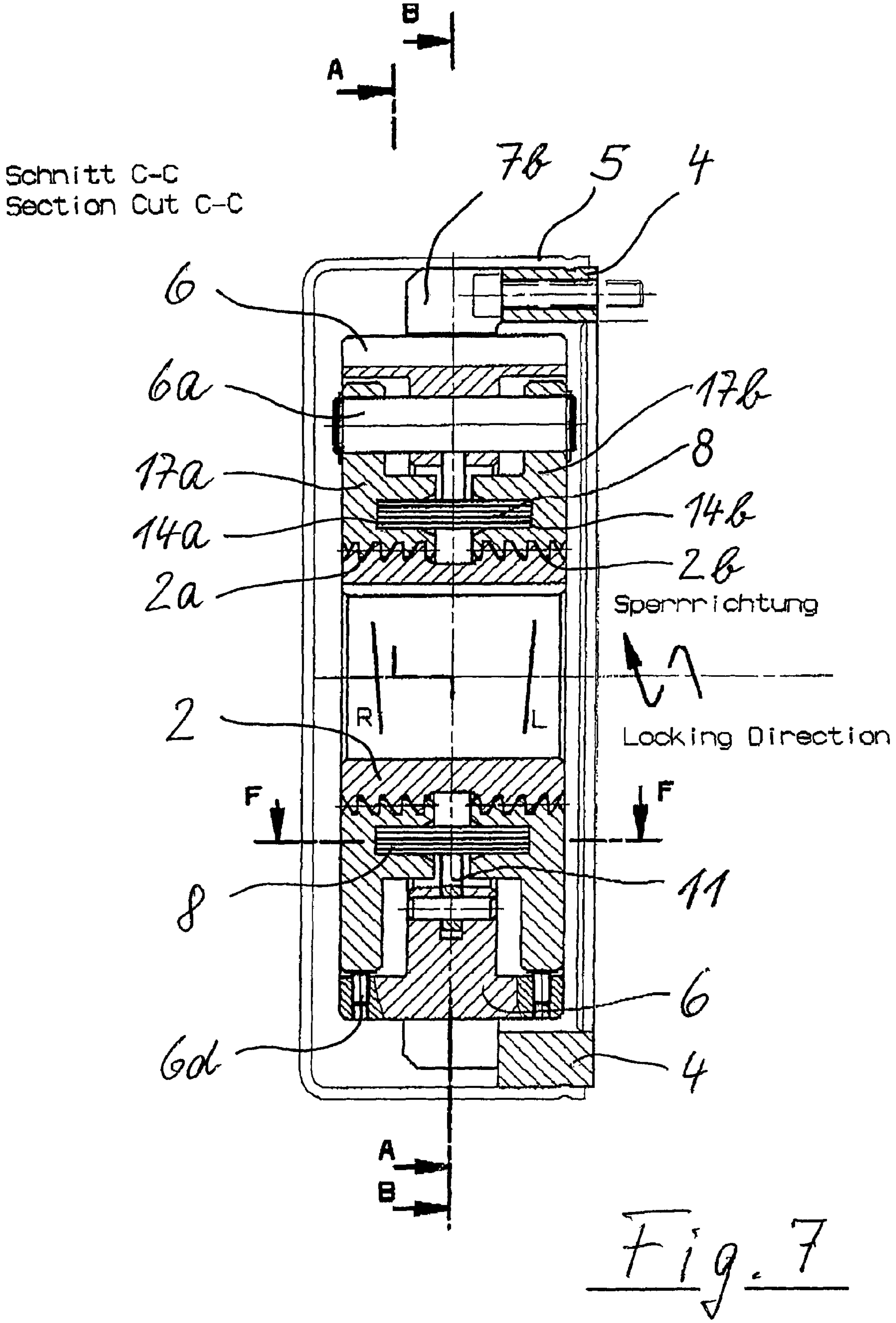
FIG. 7 is an axial cross-sectional view of an alternative structural shape of the fall safety device.
Figure 8:
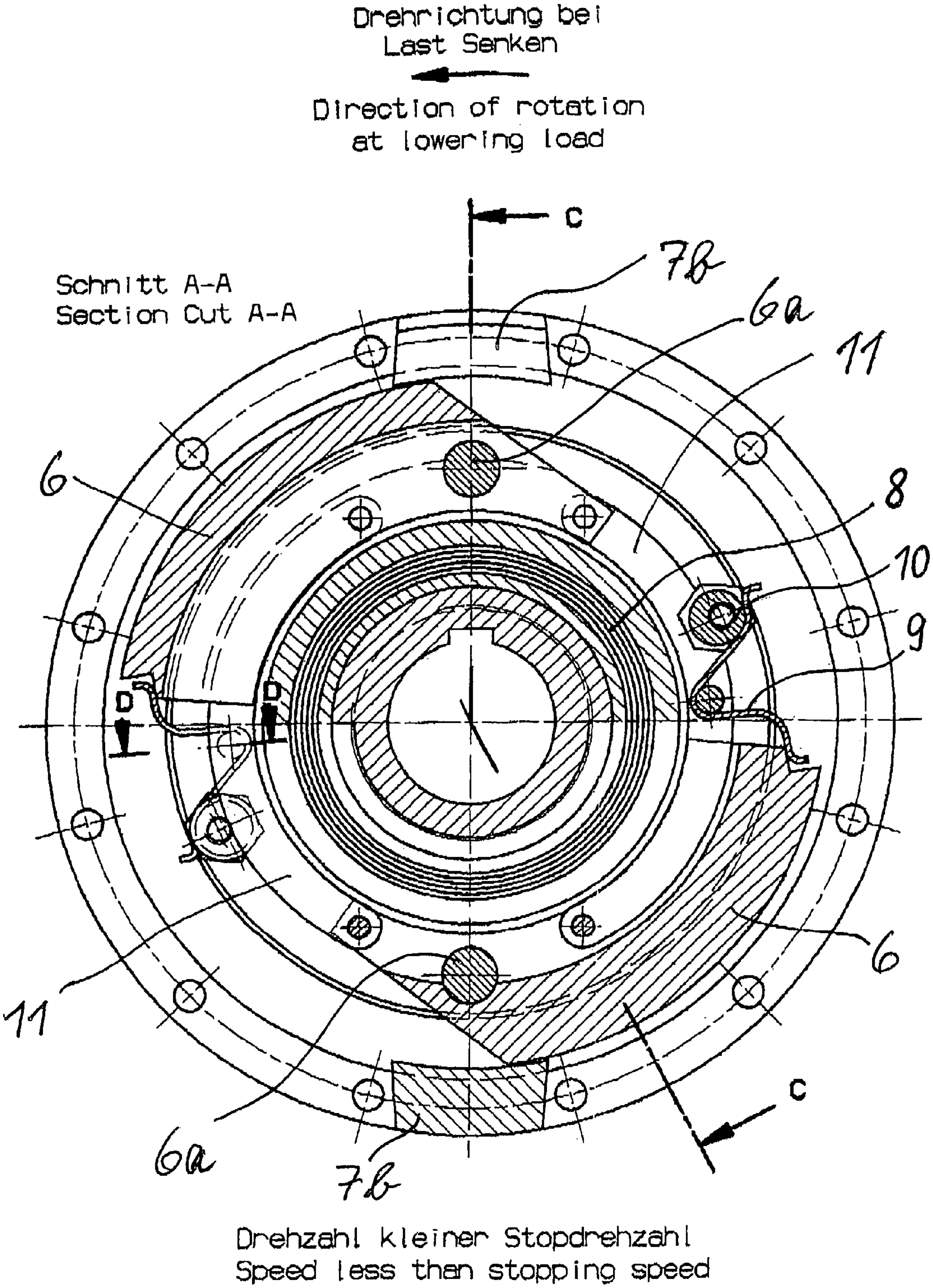
FIG. 8 is a radial cross-sectional view in normal operation.

Here, the rotor 2 is provided on its outer extent with two opposite threads, namely on the left side of FIG. 7 with a right-handed thread 2*a*, and on the right side with a left-handed thread 2*b*. On both threads sit corresponding disks 17*a* and 17*b*, respectively, which have on their inner bore a matching counter thread. Both disks 17*a* and 17*b* are connected to each other locked in rotation but moveable relative to each other in the axial direction. In the embodiment, this is realized by cross bolts, which are used simultaneously as pivot supports 6*a* for the locking members 6. In their normal position according to FIG. 8, the locking members 6 that can pivot outwards under the effect of centrifugal force are held by spring elements 9 in the radial inner position, as long as the speed of the rotor lies in the permissible range.

In addition, the locking members 6 are in turn connected by levers 11 to each other such that their pivoting movements always occur simultaneously.

The stops 7*b*, which are here not mounted on a ratchet ring with limited rotation, but instead stationary on the housing of the fall safety device, are located adjacent to the locking members 6, spaced outwards in the radial direction.

Figure 9:
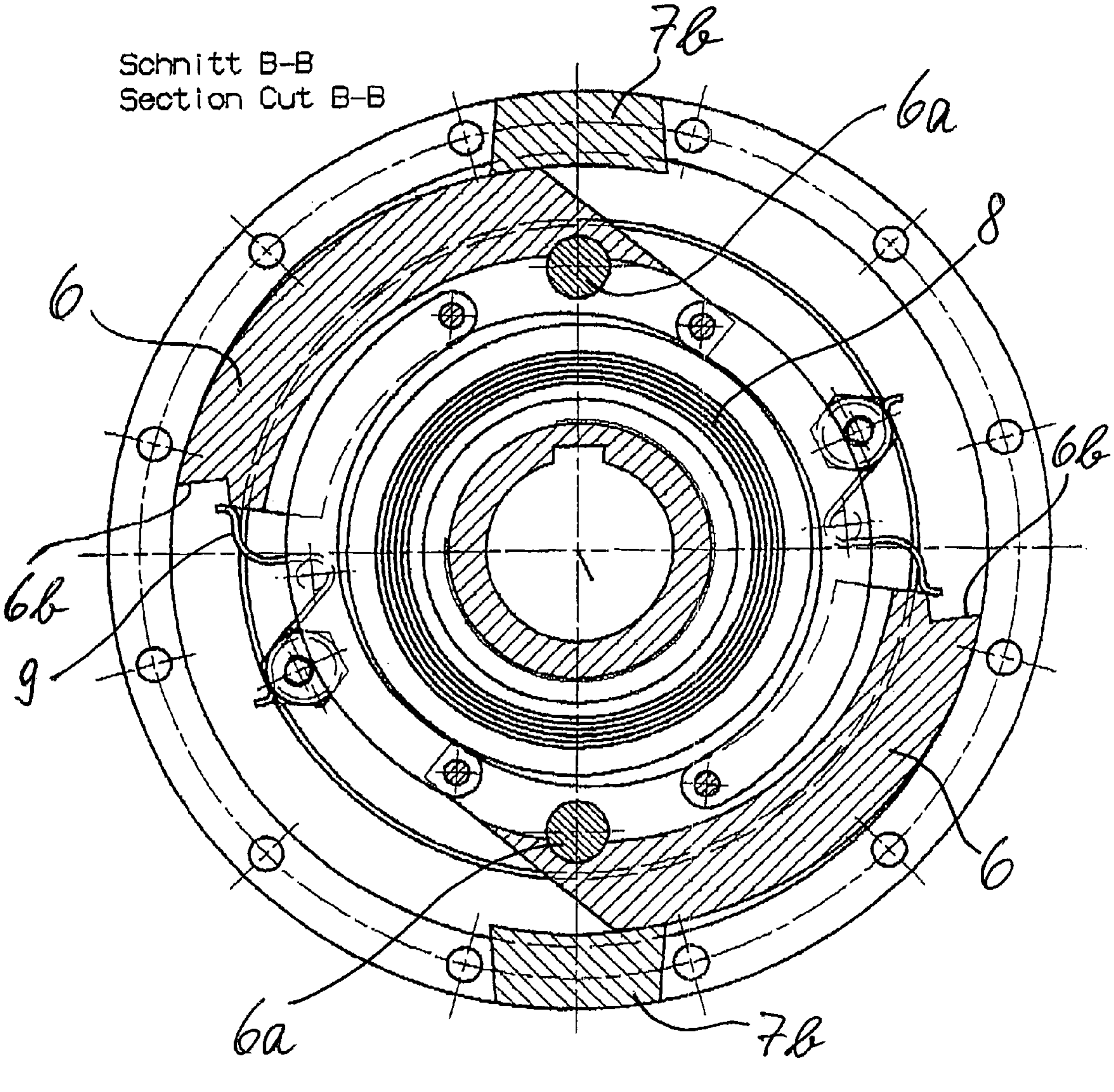
FIG. 9 is the same cross-sectional view as shown in FIG. 8 in the blocking position.

Now if an impermissible rotor speed occurs, then the locking members 6 pivot outwards, as shown in FIG. 9 and contact with their front ends against the stationary stops 7*b*. Therefore, the rotation of the disks 17*a* and 17*b* is quickly blocked. The impact occurring here is now realized, in contrast to the previous example, not by a flexible support of the stops 7*b*, but instead by a flexible support of the locking members 6 on the rotor 2. For this purpose, several braking bodies 8 that can flatten in the axial direction are arranged between the two disks 17*a* and 17*b*. These braking bodies 8 extend both in the circumferential direction and also in the axial direction in chambers 14*a* and 14*b* of the disks 17*a* and 17*b*.

Figure 10:
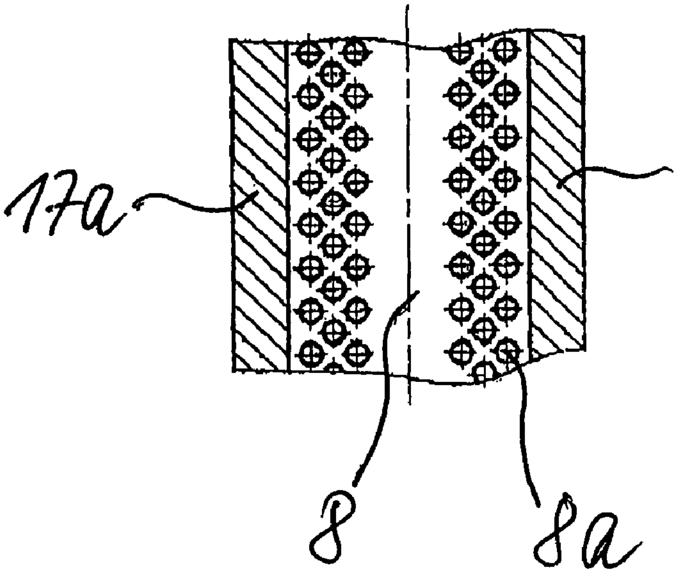
FIG. 10 is a circumferential cross-sectional view taken along the line F—F in FIG. 7.

The two threads 2*a* and 2*b* are now oriented so that for further rotation of the rotor 2 relative to the blocked disks 17*a* and 17*b*, the two disks 17*a* and 17*b* run towards each other in the axial direction. In the extreme case, the two disks continue moving until they contact each other. Here, the braking bodies 8 are plastically deformed, which is facilitated by corresponding shaping and dimensioning of the chambers 14*a* and 14*b*. Thus, it is recommended to expand the two chambers 14_a_ and 14_b_ on their facing sides in cross section so that the braking bodies can bulge in the radial direction. So that space is also available farther inwards in the chambers for the deformation of the braking bodies, the braking bodies are provided there with a plurality of recesses 8_a_, as shown in FIG. 10.

Figure 11:
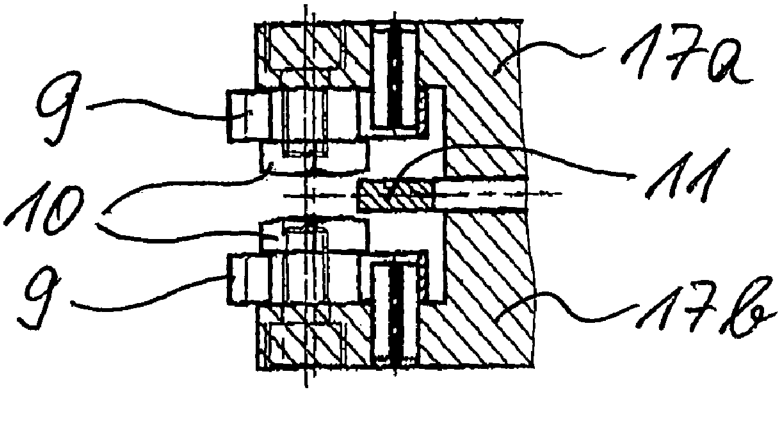
FIG. 11 is a cross-sectional view taken along the line D—D in FIG. 8.

FIG. 11 illustrates the elastic locking of the centrifugal weights in the normal position. One sees that each disk 17_a_ and 17_b_ carries a corresponding spring 9, which connects at one end to the common locking member 6 (not shown in the drawing) and in general can be adjusted by a separate cam 10 with reference to the contact force.

Finally, FIG. 7 shows in the lower half that the normal position of the locking members 6 can be adjusted in the radial direction. For this purpose, adjustment screws 6_d_ define the inner position of the locking members 6 relative to the disk 17_a_ or 17_b_ that they carry in the radial direction. Therefore, the locking members can be adjusted for very minimal radial play relative to the stops 7_b_, so that the blocking process is performed immediately if the locking members snap out of their normal position.

The main advantage of the last described structural form is that the parts exposed to the impact from the blocking process, thus the stops 7_b_ and the locking wedge 6_b_ of the locking members 6, are shifted in the radial direction farther outwards, namely nearly to the outer edge of the housing 5. Thus, long lever arms with correspondingly small impacting forces are produced.

Both embodiments have in common that the impact occurring during the blocking process is effectively damped by flattening the braking bodies in their housing and thus all parts taking part in the transfer of motion are improved considerably.

The invention claimed is:

1. Fall safety device comprising a load-bearing rotor (2, 12), which supports at least one locking member (6), which can be moved by centrifugal force and which interacts with at least one stop (7_b_) of a stator (4) if a predetermined rotor speed is exceeded and blocks further rotation of the rotor, the locking member (6) and/or the stop (7_b_) is in active connection with at least one braking body (8), which undergoes plastic deformation when the fall safety device is blocked and which damps a blocking process, the braking body (8) is arranged in at least one chamber (14, 14_a_, 14_b_) of the device.

2. Fall safety device according to claim 1, wherein the braking body (8) slides along at least one chamber wall during the plastic deformation thereof.

3. Fall safety device comprising a load-bearing rotor (2, 12), which supports at least one locking member (6), which can be moved by centrifugal force and which interacts with at least one stop (7_b_) of a stator (4) if a predetermined rotor speed is exceeded and blocks further rotation of the rotor, the locking member (6) and/or the stop (7_b_) is in active connection with at least one braking body (8), which undergoes plastic deformation when the fall safety device is blocked and which damps a blocking process, the deformation of the braking body (8) is realized in a form of flattening of the braking body.

4. Fall safety device according to claim 1, wherein the at least one locking member (6) that can move due to centrifugal force blocks the further rotation of the rotor (2) if the predetermined rotor speed is exceeded also upon overloading or failure of the braking body (8).

5. Fall safety device according to claim 1, wherein the deformation of the braking body (8) is realized at least approximately in a circumferential direction of the rotor.

6. Fall safety device according to claim 1, wherein a plurality of stops (7_b_) are arranged on a rotating ratchet wheel (7), and the ratchet wheel (7) includes at least one projection (7_a_, 7_c_) supported in a circumferential direction by at least one deformable braking bodies (8) on the stator (4).

7. Fall safety device according to claim 1, wherein the deformation of the braking body (8) is realized at least approximately in an axial direction of the rotor.

8. Fall safety device according to claim 1, wherein the rotor (2) has two opposing threads (2_a_, 2_b_), on each of which a disk (17_a_, 17_b_) can rotate, the disks (17_a_, 17_b_) being adapted to perform an axial shift and/or relative rotation during a blocking process in order to deform the at least one braking body (8).

9. Fall safety device according to claim 8, wherein the braking body (8) is arranged between the disks (17_a_, 17_b_).

10. Fall safety device according to claim 1, wherein the deformable braking body (8) has a plurality of recesses (8_a_), perforations or pores.

11. Fall safety device according to claim 10, wherein the deformable braking body (8) is formed of several flattenable deformation bodies made from ductile metal.

12. Fall safety device according to claim 11, wherein the braking body has an element (14) to receive its possible deformation, which if necessary is in active connection with the lifting drive with the fall safety device.

13. Fall safety device according to claim 1, wherein the deformable braking body (8) is arranged in a groove in at least one of the stator and rotor.

14. Fall safety device according to claim 13, wherein the at least one locking member (6) is held on the rotor (2, 12) by a snap-in connection (4).

15. Fall safety device according to claim 1, wherein a snap-in connection (9) can be adjusted in terms of a holding force via a pretensioned locking element.

16. Fall safety device according to claim 15, wherein at least two locking members (6) are provided, which are in active connection with each other such that they can only be jointly moved into engagement with associated stops (7_b_).

17. Fall safety device according to claim 16, wherein the two locking members (8) are connected to each other by at least one mutually hinged lever (11).

18. Fall safety device according to claim 1, wherein the locking member (6) is fixed in an engagement position for deformation of the braking body (8).

19. Fall safety device according to claim 18, wherein relative rotation between ratchet wheel (7) and stator (4) triggers a fixing of the locking member (6) in the engagement position.

20. Fall safety device according to claim 19, wherein relative rotation creates an axial shift of the ratchet wheel (7) and the ratchet wheel in its shifted position blocks a release of the locking member (6) from its engagement position.

* * * * *